Feb. 13, 1968     DUNCAN TONG     3,368,303
MOLDED RECEPTACLE FOR FLOWERS
Filed June 29, 1966
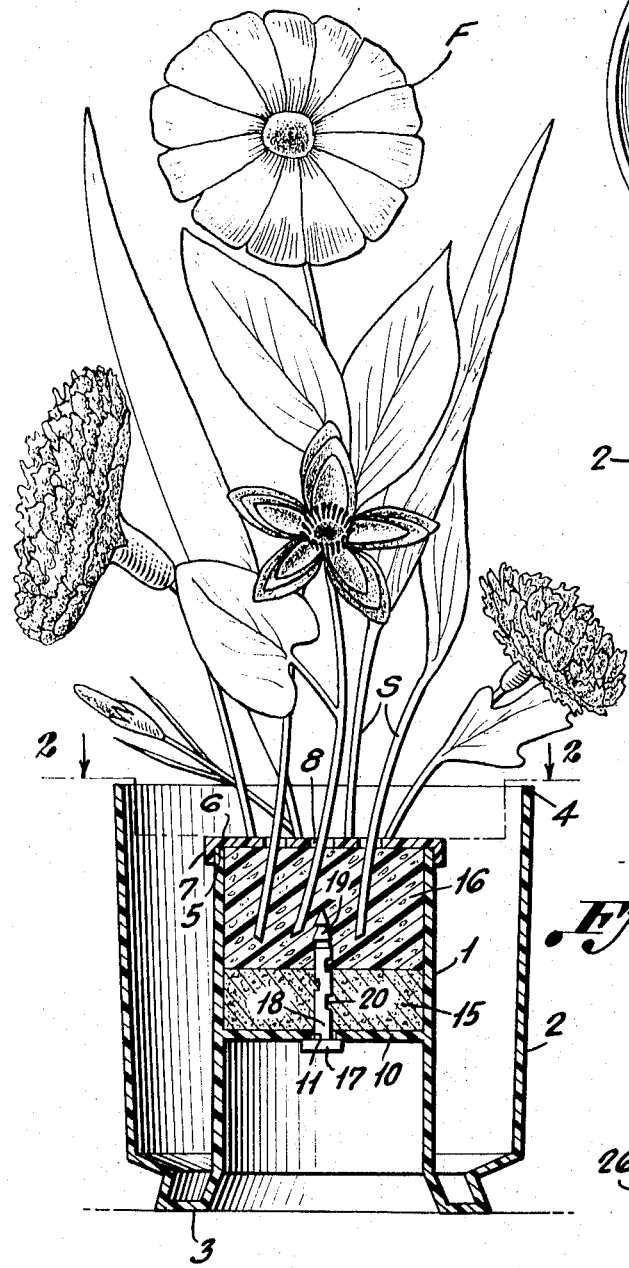
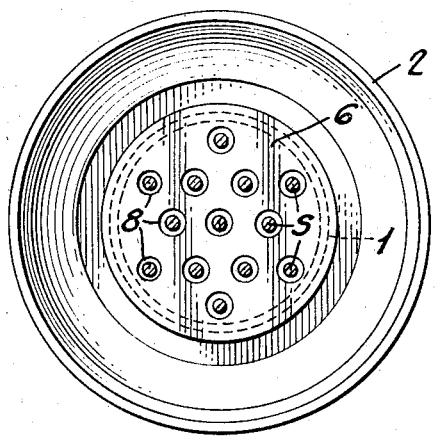
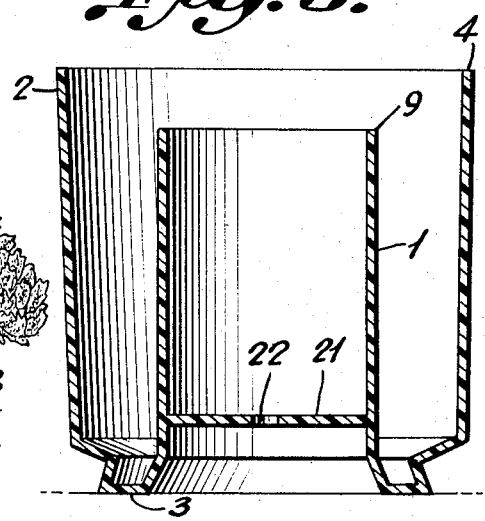
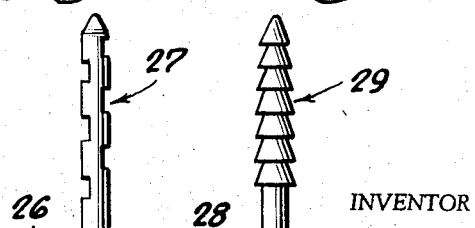
INVENTOR
DUNCAN TONG
BY *Samuel Blount*
ATTORNEY United States Patent Office 3,368,303
Patented Feb. 13, 1968

3,368,303
MOLDED RECEPTACLE FOR FLOWERS
Duncan Tong, 23C Robinson Road, Victoria, Hong Kong
Filed June 29, 1966, Ser. No. 561,426
6 Claims. (Cl. 47—41.12)

This invention relates to a flower receptacle of molded plastic material which is formed of an inner housing surrounded by an outer receptacle, the two of which are joined at the base thereof. The inner housing of the unit serves for the retention of flowers or other plant material at the central portion thereof, which material may be spread therefrom and assume normal esthetic positions above the combined receptacle unit.

It is the object of the present invention to provide a low-cost unit of molded plastic material which is rugged in construction and which is adapted to receive holding material for flowers of different form. The holding material is adapted to be securely retained within the inner housing and to be hidden from view by a detachable perforated cover on the top of the inner housing.

Other objects and purposes will appear from the detailed description of the invention following hereinafter, taken in conjunction with the accompanying drawing wherein FIG. 1 is a vertical sectional view of a preferred embodiment of a flower receptacle in accordance with the invention, with a floral arrangement shown in elevation;

FIG. 2 is a horizontal sectional view along line 2—2 of FIG. 1;

FIG. 3 is a vertical sectional view of a second embodiment of the invention;

FIG. 4 is a front elevation of a headed fastener for securing the holding material for the flowers; and FIG. 5 is a front elevation of another embodiment of a headed fastener.

In the drawing is shown a flower receptacle of molded plastic material composed of an inner housing 1 and an outer receptacle 2 which are joined together at the base 3. The upper edge of the receptacle 4 terminates above the level of the edge 5 of the inner housing, and a closure 6, provided with a downwardly extending lateral flange 7 is adapted to cover the open end of the inner housing 1. A plurality of perforations 8 are provided in the closure for the reception of the stems S of flowers or plants which may be inserted into the interior of the inner housing, the bottom of which is defined by a shelf 10 molded integrally with the lateral wall of the housing. This shelf not only reenforces the inner housing but provide a base for the reception of one or more blocks of plastic material which are deposited within the interior of the housing.

The upper block 16 is preferably formed of porous plastic material, such as styrofoam, and the lower block may be of heavier material, such as plaster-of-Paris, cement or porous plastic of even greater density, which may be obtained by mixtures of plaster and styrofoam. These blocks conform to the horizontal cross-section of the inner housing and may be secured against shifting movement by the provision of a headed fastener 17 which extends through an opening 11 in the bottom of the shelf 10. This headed fastener is provided with a shank 18 having upwardly tapered conical serrations 19 adjacent to the pointed end of the fastener and laterally staggered projections 20 therebelow and adjacent to the headed end of the fastener.

The blocks of holding material 15 and 16 are placed in the inner housing and are seceured therein by means of the headed fastener. The upper block 16 is covered by the closure 6 which lends a finished appearance to the unit and the flowers are adapted to be impaled into the holding material within the inner housing by extending the stems through the openings 8 in the cover 6. Thereafter, the flowers may be arranged to impart an esthetic effect to the assembly.

The holding and reenforcing shelf 10 may be molded across the inner housing 1 at various levels thereof and FIG. 3 shows a different position of the retaining shelf 21 with a central opening 22. If a mass of cementitious material is disposed in the bottom of the housing which terminates at the upper edge 9, the resulting assembly is of greater stability than that shown in FIG. 1, even though the reenforcement of the shelf at the bottom end of the housing is not as effective as that shown in FIG. 1 wherein the shelf is disposed at an intermediate height of the housing.

FIGS. 4 and 5 show different forms of headed fasteners which may be used for the retention of the blocks of holding material within the inner housing. FIG. 4 shows the headed fastener 26 with a shank 27 having the laterally staggered projections along the entire length of the shank, and FIG. 5 shows the headed fastener 28 with a shank 29 provided with upwardly tapered conical serrations along substantially the entire length thereof.

While the illustrated embodiment shows the inner housing and receptacle of cylindrical cross-section arranged concentrically, the outlines may be varied to obtain desirable esthetic effects. The illustrated arrangement of concentric cylindrical outlines simplifies the obtention of a circular cover for the opening end of the inner housing.

While I have described my invention as embodied in specific forms and as operating in specific manners for purposes of illustration, it should be understood that I do not limit my invention thereto, since various modifications will suggest themselves to those skilled in the art without departing from the spirit of my invention, the scope of which is set forth in the annexed claims.

I claim:
1. A flower holder of molded plastic material comprising an inner housing surrounded by a receptacle and joined together at the base thereof, both said housing and receptacle being open at the tops thereof with the top of said housing terminating a fractional amount of the height of the housing below the level of the open mouth of said receptacle, to permit the insertion of a porous mass of material thereinto for the retention of flower stems, said inner housing adapted to contain a porous mass of plastic material adjacent to the upper end thereof, and a completely detachable perforated cover for said last-mentioned upper end adapted to have plant stems extended through the perforations in said cover and into said porous mass for detachable securement therein.

2. A device as set forth in claim 1 having a molded shelf across the bottom of said housing for supporting said porous mass, said shelf also being provided with an opening at the center thereof, and a headed fastener extending from the external bottom of said shelf and into said porous mass.

3. A device as set forth in claim 2 wherein said shelf detachably supports a cementitious body which is disposed below said porous mass.

4. A device as set forth in claim 2 wherein said headed fastener comprises a shank with laterally staggered projections along the length thereof.

5. A device as set forth in claim 2 wherein said headed fastener comprises a shank with upwardly tapered conical serrations along the length thereof.

6. A device as set forth in claim 2 wherein said headed fastener comprises a shank with upwardly tapered conical serrations adjacent to the pointed end thereof and laterally staggered projections therebelow.

References Cited
UNITED STATES PATENTS

| | | | |
|---|---|---|---|
| 1,562,992 | 11/1925 | Schling | 47—41.13 |
| 1,596,716 | 8/1926 | Clarke | 47—41.13 |
| 2,750,138 | 6/1956 | Morris | 47—41 |
| 3,003,284 | 10/1961 | Smithers | 47—41.12 |
| 3,148,480 | 9/1964 | Gallo | 47—41.12 |

ROBERT E. BAGWILL, *Primary Examiner.*